United States Patent [19]

Sommer et al.

[11] Patent Number: 4,808,559

[45] Date of Patent: Feb. 28, 1989

[54] METHOD OF MANUFACTURING A CATALYST FOR HYDRATION OF OLEFINS TO ALCOHOLS

[75] Inventors: August Sommer; Dietrich Schlueter, both of Herne, Fed. Rep. of Germany

[73] Assignee: Hüls Aktiengesellschaft, Marl, Fed. Rep. of Germany

[21] Appl. No.: 151,194

[22] Filed: Feb. 1, 1988

[30] Foreign Application Priority Data

Mar. 21, 1987 [DE] Fed. Rep. of Germany ....... 3709401

[51] Int. Cl.[4] .......................... B01J 21/04; B01J 21/06
[52] U.S. Cl. ......................................... 502/63; 502/81; 502/84
[58] Field of Search ............................. 502/63, 81, 84

[56] References Cited

U.S. PATENT DOCUMENTS

| | | | |
|---|---|---|---|
| 2,375,641 | 5/1945 | Garrison | 502/84 |
| 2,408,207 | 11/1941 | Garrison et al. | 502/63 |
| 4,299,730 | 11/1981 | Sommer et al. | 502/63 |
| 4,329,257 | 5/1982 | Sommer et al. | 502/81 |
| 4,499,195 | 2/1985 | Wheelock | 502/84 |
| 4,692,425 | 9/1987 | Schneider et al. | 502/81 |

Primary Examiner—Patrick P. Garvin
Assistant Examiner—George R. Fourson
Attorney, Agent, or Firm—Oblon, Fisher, Spivak, McClelland & Maier

[57] ABSTRACT

A method of manufacturing a catalyst for hydration of olefins to alcohols. A montmorillonite-containing clay is employed as a catalyst support for phosphoric acid, to which a fine-grained silica gel is added after a first acid treatment. The silica gel has a particle size distribution between 30 and 60 micron, a pore volume of 0.9–1.7 ml/g, and a specific surface of 200–500 sq m/g.

14 Claims, No Drawings

METHOD OF MANUFACTURING A CATALYST FOR HYDRATION OF OLEFINS TO ALCOHOLS

BACKGROUND OF THE INVENTION

1. Field of the Invention

The invention relates to a method of manufacturing a catalyst comprising argillaceous minerals and silica gel for the hydration of olefins to alcohols.

2. Discussion of the Background

It is known that olefins can be converted to alcohols in the gas phase at elevated pressures, using steam. Such methods have become particularly important in industry for manufacturing ethanol and isopropanol from ethylene and propylene, respectively. These alcohols are synthesized in the presence of catalysts, namely usually phosphoric acid, provided on a support.

Known supports are either based on pure silicic acid, e.g., kieselguhr or kieselgel (U.S. Pat. No. 2,579,601) or on silicic acid with a greater or lesser amount of alumina, e.g., calcined diatomaceous earth, wherein the structure of the material is held together by clay or clay-containing material (Ger. Pat. No. 2,722,616; U.S. Pat. No. 3,311,568).

With supports based on pure silicic acid, there are problems of the strength of the material over long service times. The alumina-containing materials have much better mechanical strength, but when the alumina content is too high, aluminum oxide is leached out by the phosphoric acid.

In Ger. Pat. No. 1,156,772 a method is described of manufacturing an alumina-containing support for the phosphoric acid used as a catalyst in olefin hydration, wherein formed catalyst bodies comprised of mineral aluminosilicate are treated with mineral acid such that the aluminum oxide content is preferably reduced to between 1 and 5 wt. %. This material in general has the required mechanical strength, along with a small enough residual aluminum oxide content to avoid the above-described leaching. On the other hand, when commercially available catalyst bodies are employed for manufacturing the catalyst supports for olefin hydration, it is observed that catalyst activities vary widely if the raw material is not selected carefully in advance.

Supports for phosphoric acid have also been developed which are based on large-pore kieselgels and which have high hydration activity and ample mechanical s strength (Ger. Pat. Nos. 2,625,705 and 2,719,055). However, these supports, based on amorphous silicic acid, have the disadvantage that upon extended service time under the conditions of the hydration reaction the amorphous silicic acid partially crystallizes, resulting in a substantial and irreversible reduction in the specific surface and thereby in the catalytic activity, as well as reduced mechanical strength.

Another disadvantage of all previously employed hydration catalysts comprising phosphoric acid on a siliceous (silicate) support is the slow decrease in activity due to removal of phosphoric acid, which must be neutralized with alkali when operating in a continuous mode, in order to avoid corrosive effects of the acidified raw alcohol on downstream equipment.

By continuous injection of phosphoric acid in an amount corresponding to the amount of phosphoric acid removed, it is possible to substantially prevent the continuing loss of activity (Ger. Pat. No. 2,658,946), and thereby greatly extend catalyst life. However, this imposes corresponding requirements on the life of the carrier itself, so that one may use a carrier in which crystallization occurs, under the reaction conditions, accompanied by irreversible reduction of the catalytic activity, and in which the mechanical strength decreases with time.

As shown in Ger. Pat. No. 2,908,491, the use of argillaceous minerals results in a support for a hydration catalyst providing constantly high catalytic activity, if, by careful choice of raw materials, one ensures that the material comprises montmorillonite to a high degree. The montmorillonite leads to high surface and large sorption volume after the forming, leaching and impregnating.

The thus manufactured catalysts and supports comprising montmorillonite-containing clay have greater activity than catalysts and supports manufactured from formed catalyst bodies based on mineral aluminosilicate of different origin, i.e. per hour and per liter of catalyst bed one obtains about 105–110 g ethanol, or about 300 g isopropanol. However the only way to maintain this high activity over an extended time is to continually add phosphoric acid to replace that which was been removed. The amount of such acid for ethanol manufacture is about 0.07 g per hour per liter catalyst bed, and for isopropanol manufacture about 0.01 g per hour per liter catalyst bed. One must still neutralize the removed acid with alkali. The mechanical strength of the catalysts is on the order of 70–90 Newtonsphere, which is sufficient for charging typical reactors.

Another improvement of the catalyst properties was achieved according to Ger. Pat. No. 2,929,919. With a catalyst produced according to Ger. Pat. No. 2,908,491, according to Ger. Pat. No. 2,929,919 there is also added during the process an oxide or a plurality of oxides of elements of group VIa of the periodic table, in the amount of 5–15 wt. % based on the total dry weight. The improvements obtained include increase of mechanical strength to 110–130 N/sphere, increase of catalytic activity to yield about 130 g ethanol and about 350 g isopropanol per hour per liter catalyst bed, and reduction of phosphoric acid removal to about 0.035 g per hour per liter catalyst bed for ethanol manufacture, and to about 0.005 g per hour per liter catalyst bed for isopropanol manufacture. It is seen that this reduction of phosphoric acid removal is approximately one half, in both cases.

Thus a catalyst with adequate service life and extended retention of mechanical strength was devised, with the phosphoric acid removal having been reduced to a satisfactory level. At this point, the only way in which the primarily silica-gel based supports were superior to montmorillonite-based supports was in their initial activity. For example, according to Ger. Pat. No. 2,722,616, up to 144 g ethanol was produced per hour per liter catalyst bed, but only 115 g isopropanol per hour per liter catalyst bed. In U.S. Pat. No. 3,311,568, a substantially higher catalyst activity was described, with 240 g ethanol being produced per hour per liter catalyst bed. Here phosphoric acid was added gradually over all 24 hours each day, and the activity was observed over only 1,500 hour, thus about 2 months. It is reported that the strength increased with increased proportion of bentonite. Bentonite was mixed into the diatomaceous earth in the amount of 3–5% prior to the sintering, according to this reference.

SUMMARY OF THE INVENTION

It has been discovered in connection with the present invention that, surprisingly, the good catalytic properties reported in Ger. Pat. Nos. 2,908,491 and 2,929,919, with regard to extended retention of mechanical strength and good fixing of the phosphoric acid, are retained, and at the same time the activity, expressed as the amount of alcohol produced per unit time per unit catalyst volume, can be substantially increased, and moreover is retained practically unchanged over a period of 6 months, if the high-montmorillonite-content clay treated with acid in the first stage (before the forming for calcining) has added to it a fine-grained silica gel in the amount of 20-40 wt. % (total dry weight basis), whereby the surface and pore volume of the finished catalyst support are increased.

Specifically, the method of the present invention comprises the steps of:

(i) obtaining a montmorillonite-containing argillaceous support material, said support material comprising not more than 3 wt. % quartz, feldspar and mica impurities and said material containing up to 0.5 wt. % $K_2O$;

(ii) acid treating said support material, whereby said acid treated support material comprises 10-20 wt. % $Al_2O_3$ and has a specific surface of 200-400 $m^2/g$;

(iii) adding 20-40 wt. %, based on the overall dry weight, of fine-grained silica gel to said acid treated support material to prepare a mixture, wherein said silica gel has a particle size distribution substantially between 30-60 microns, a pore volume of 0.9-1.7 ml/g and a specific surface of 200-500 $m^2/g$;

(iv) pressure forming and calcining said mixture to prepare a formed support material, (v) acid treating said formed support material, whereby said acid treated formed support material comprises 1-4 wt. % $Al_2O_3$ and has a specific surface of 180-250 $m^2/g$ and a pore volume of 0.8-1.5 ml/g; and (vi) impregnating said acid treated formed support material with phosphoric acid.

DETAILED DESCRIPTION OF THE PREFERRED EMBODIMENTS

Accordingly, the invention comprises a method of manufacturing a catalyst comprised of argillaceous minerals and silica gel for hydration of $C_{2-3}$ olefins to form the corresponding alcohols, which employs phosphoric acid applied to the basically montmorillonite-containing argillaceous support material in a two-stage acid treatment of said support, wherein the support contains not more than 3% of impurities (such as quartz, feldspar, and mica) and may contain up to 0.5% $K_2O$, and wherein forming and calcination are carried out between the two acid treatments; characterized in that one adds fine-grained silica gel to the clay which has been acid-treated in the first stage to 10-20 wt. % $Al_2O_3$, preferably 13-18 wt. % $Al_2O_3$, and which has specific surface 200-400 $m^2/g$, preferably 240-300 $m^2/g$, said silica gel being added in the amount of 20-40 wt. % based on the overall dry weight, and then the material with total water content 40-60% is pressure formed, calcined at 500°-900° C., and the formed support material is then treated with acid in a second stage, to an $Al_2O_3$ content of 1-4 wt. %, preferably 1-2 wt. %, and a specific surface of 180-250 $m^2/g$, preferably 200-220 $m^2/g$, with pore volume between 0.8 and 1.5 ml/g, preferably 0.9-1 ml/g, whereupon the resulting support is impregnated with phosphoric acid in known fashion, wherein the fine-grained silica gel has particle size distribution chiefly between 30 and 60 micron, a pore volume of 0.9-1.7 ml/g, preferably 1-1.2 ml/g, and a specific surface of 200-500 $m^2/g$, preferably 380-400 $m^2/g$.

The pore diameters of the finished support prior to the impregnation with phosphoric acid are in the range between 1 and $20 \times 10^{-3}$ micron, with the maximum of the frequency distribution being at $5 \times 10^{-3}$ micron.

Other minerals of the montmorillonite group may be used which do not contain potassium but contain the montmorillonite crystal lattice.

Another variant, particularly for increasing the mechanical strength and reducing the phosphoric acid removal, consists of adding one or more oxides of metals of group VIa of the periodic table, in the amount of 5-15 wt. % (overall dry weight basis).

It has further been discovered in connection with the invention that the strength of the support material can be substantially increased even without addition of the one or more oxides of metals of group VIa in the amount of 5-15 wt. %, namely by re-calcining the formed material comprised of montmorillonite-containing clay and 20-40% silica gel following the second acid treatment and after the drying at a preferred $Al_2O_3$ content of 1-2 wt. %, said re-calcining being carried out at about 800° C. for 5-10 hours, wherein the physical parameters such as specific surface (200-220 $m^2/g$) and pore volume (0.9-1 ml/g) are preserved. Then the hardened support is impregnated with phosphoric acid in known fashion.

The mechanical strength can be further increased by heating the catalyst impregnated with phosphoric acid for 5-10 hours at 800°-1000° C. In this way, sphere compression strengths between 80 and 100 Newton are achieved.

Other features of the invention will become apparent in the course of the following descriptions of exemplary embodiments which are given for illustration of the invention and are not intended to be limiting thereof.

EXAMPLES

Example 1

A comminuted natural raw clay, selected by laboratory testing such that upon treatment for 1 hour with 20% HCl at 82° C. not more than 5 g $K_2O$ is extracted per kg dry material charged, was heated 1 hour with 20% HCl in the amount of 8.4 mol HCl per kg clay at 82° C., was washed to remove the acid, and was dried. The result was a material with a residual aluminum oxide content of 16 wt.% and specific surface of 300 $m^2/g$.

To 70 parts of this dried material there was added 30 parts fine-grained silica gel with particle size distribution principally between 30 and 60 micron, pore volume 1.1 ml/g, and specific surface 410 $m^2/g$. After addition of water to make a paste with a total water content of 50%, the material was pressed into 5 mm diameter spheres. These were hardened by heating 5 hours at 800° C.

The resulting catalyst spheres were treated twice (1 hour each time) with 20% HCl at 100°-110° C. and were washed with water to remove the acid. After drying at about 110°–120° C., an aluminum oxide content of 1.5 wt. % was determined in the spheres, and their specific surface was determined at 210 m²/g, their pore volume 0.95 ml/g.

The spheres were then flooded with 60 wt.% phosphoric acid which was allowed to act 2 hours, following which the spheres were dried again at about 110°–120° C. The thus treated spheres had a phosphoric acid content of 44.8 wt. %. The mean compressive strength was 70 N/sphere.

When this manufactured hydration catalyst was used for producing ethanol from ethylene and water in the gas phase at 235° C. and pressure 70 bar, a catalytic yield of 160 g ethanol per hour per liter catalyst bed could be obtained. After the apparatus had operated for 6 months, this yield value was practically undiminished. The removal of phosphoric acid under the reaction conditions was 0.07 g per hour per liter catalyst bed.

Example 2

The procedure was as in Example 1, except that after the third HCl treatment, followed by water washing, and drying at 110°–120° C., the spheres were recalcined 10 hours at about 800° C., as a hardening step. The spheres then had an aluminum oxide content of 1.3 wt. %, specific surface of 195 m²/g, and pore volume of 0.96 ml/g.

After the phosphoric acid flooding treatment as per Example 1, and drying at about 110°–120° C., the spheres has phosphoric acid content of 45.1 wt. % and mean compressive strength of 80 N/sphere.

The hourly yield of ethanol in ethylene hydration, hourly yield of ethanol after 6 months service time of the catalyst, and phosphoric acid removal rate were the same as in Example 1.

Example 3

The procedure and results were as in Example 1, except as follows:

After the third HCl treatment, followed by water washing, and drying at 110°–120° C., the spheres had an aluminum oxide content of 1.4 wt. %, specific surface of 200 m²/g, and pore volume of 0.95 ml/g.

The spheres were then flooded with 50 wt. % phosphoric acid which was allowed to act 2 hours, following which the spheres were dried again at about 110°–120° C. The thus treated spheres had a phosphoric acid content of 38.8 wt. %.

To further harden the catalyst which had been treated with phosphoric acid, it was heated 10 hours at 900° C. The thus re-calcined support had an average compressive strength of 90 Newton/sphere.

The hourly yield of ethanol in ethylene hydration and hourly yield of ethanol after 6 months service time of the catalyst were the same as in Example 1. The phosphoric acid removal under the reaction conditions was reduced by 50%, comprising 0.035 g per hour per liter catalyst bed.

Example 4:

A comminuted natural raw clay, selected by laboratory testing such that upon treatment for 1 hour with 20% HCl at 82° C. not more than 5 g K₂O is extracted per kg dry material charged, was heated 1 hour with 20% HCl (8.4 mol HCl per kg clay) at 82° C., was washed to remove the acid, and was dried. The result was a material with residual aluminum oxide content of 16 wt. % and specific surface of 300 m²/g.

To 70 parts of this dried material there was added 30 parts fine-grained silica gel with particle size distribution principally between 30 and 60 micron, pore volume of 1.1 ml/g, and specific surface of 410 m²/g. Then to these 100 parts there was added an additional 8 parts CrO₃, whereby the mixture contained CrO₃ in the amount of 7.4%. After addition of water to make a paste with total water content of 50%, the material was pressed into 5 mm diameter spheres. These were hardened by heating 5 hours at 800° C.

The resulting catalyst spheres were treated twice (1 hour each time) with 20% HCl at 100°–110° C. and were washed with water to remove the acid. After drying at about 110°–120° C., an aluminum oxide content of 1.4 wt. % was determined in the spheres, and their specific surface was determined at 200 m²/g, their pore volume at 0.94 ml/g.

The spheres were then flooded with 60 wt. % phosphoric acid which was allowed to act 2 hours, following which the spheres were dried again at about 110°–120° C. The thus treated spheres has a phosphoric acid content of 44.5 wt. %. The mean compressive strength was 80 N/sphere.

When this manufactured hydration catalyst was used for producing ethanol from ethylene and water in the gas phase at 240° C. and pressure 70 bar, a catalytic yield of 180 g ethanol per hour per liter catalyst bed could be obtained. After the apparatus had operated for 6 months, this yield value was practically undiminished. The removal of phosphoric acid under the reaction conditions was 0.035 g per hour per liter catalyst bed.

Example 5

A comminuted natural raw clay, selected by laboratory testing such that upon treatment for 1 hour with 20% HCl at 82° C. not more than 5 g K₂O is extracted per kg dry material charged, was heated 1 hour with 20% HCl (in the amount of 8.4 mol HCl per kg clay) at 82° C., was washed to remove the acid, and was dried. The result was a material with residual aluminum oxide content 16 wt. % and specific surface 300 m²/g.

To 70 parts of this dried material there was added 30 parts fine-grained silica gel with particle size distribution principally between 30 and 60 micron, pore volume 1.1 ml/g, and specific surface 410 m²/g. Then to these 100 parts there was added an additional 3 parts CrO₃, 3 parts MoO₃, and 5 parts WO₃, whereby the mixture contained oxides of elements of group VIa of the periodic table in a total amount of 10%. After addition of water to make a paste with total water content of 50%, the material was pressed into 5 mm diameter spheres. These were hardened by heating 5 hours at 800° C.

The resulting catalyst spheres were treated twice (1 hour each time) with 20% HCl at 100°–110° C. and were washed with water to remove the acid. After drying at about 110°–120° C., an aluminum oxide content of 1.4 wt. % was determined in the spheres, and their specific surface was determined at 200 m²/g, their pore volume at 0.94 ml/g.

The spheres were then flooded with 40 wt. % phosphoric acid which was allowed to act 2 hours, following which the spheres were dried again at about 110°–120° C. The thus treated spheres had a phosphoric acid content of 32 wt. %. The mean compressive strength was 80 N/spheres.

When this manufactured hydration catalyst was used for producing isopropanol from propylene and water in the gas phase at 186° C. and pressure 38 bar, a catalytic yield of 360 g isopropanol per hour per liter catalyst bed could be obtained. After the apparatus had operated for 6 months, this yield value was practically undiminished. The removal of phosphoric acid under the reaction conditions was 0.005 g per hour per liter catalyst bed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of manufacturing a catalyst comprised of argillaceous minerals and silica gel for the hydration of a $C_{2-3}$ olefin to form the corresponding alcohol, comprising the steps of:
    (i) obtaining a montmorillonite-containing clay support material, said support material comprising not more than 3 wt. % impurities, said impurities comprising quartz, feldspar and mica impurities and said material containing up to 0.5 wt. % $K_2O$;
    (ii) acid treating said support material, whereby said acid treated support material comprises 10-20 wt. % $Al_2O_3$ and has a specific surface area of 200-400 $m^2/g$;
    (iii) adding 20-40 wt. %, based on the overall dry weight, of fine-grained silica gel to said acid treated support material to prepare a mixture, wherein said silica gel has a particle size distribution substantially in the range of 30-60 microns, a pore volume of 0.9-1.7 ml/g and a specific surface area of 200-500 $m^2/g$;
    (iv) pressure forming and calcining said mixture to prepare a formed support material;
    (v) acid treating said formed support material, whereby said acid treated formed support material comprises 1-4 wt. % $Al_2O_3$ and has a specific surface area of 180-250 $m^2/g$ and a pore volume of 0.8-1.5 ml/g; and
    (vi) impregnating said acid treated formed support material with phosphoric acid.

2. The method of claim 1, wherein said support material further comprises minerals of the montmorillonite group which do not contain potassium but contain the montmorillonite crystal lattice.

3. The method of claim 1, further comprising:
    adding 5-15 wt. %, based on the total dry weight of said mixture, of one or more oxides of metals of Group VIa of the periodic table, after said adding step but before said pressure forming step.

4. The method of claim 1, further comprising recalcining said acid treated formed support material for 5-10 hours at about 800° C., before said impregnating step.

5. The method of claim 1, further comprising:
    calcining said impregnated support material for 5-10 hours at 800°-1,000° C.

6. The method of claim 1, wherein said acid treated support material comprises 13-18 wt. % $Al_2O_3$.

7. The method of claim 1, wherein said acid treated support material has a specific surface area of 240-300 $m^2/g$.

8. The method of claim 1, wherein said mixture has a total water content of 40-60 wt. %.

9. The method of claim 1, wherein said acid treated formed support material has an $Al_2O_3$ content of 1-2 wt. %.

10. The method of claim 1, wherein said acid treated formed support material has a specific surface area of 200-220 $m^2/g$.

11. The method of claim 1, wherein said acid treated formed support material has a pore volume of 0.9-1 ml/g.

12. The method of claim 1, wherein said silica gel has a pore volume of 1-1.2 ml/g.

13. The method of claim 1, wherein said silica gel has a specific surface area of 380-400 $m^2/g$.

14. The method of claim 1, wherein said calcining is performed at 500°-900° C.

* * * * *